United States Patent [19]

Fernique

[11] 4,153,180

[45] May 8, 1979

[54] AUTOMATIC DEVICE FOR SUPPLYING AN INJECTION MACHINE WITH A MATERIAL SUCH AS AN ELASTOMER

[75] Inventor: Bernard Fernique, Poissy, France

[73] Assignee: Somifra (Societe d'Outillage et de Mecanique de l'Ile-de France), Claye Souilly, France

[21] Appl. No.: 872,328

[22] Filed: Jan. 24, 1978

[30] Foreign Application Priority Data

Jan. 27, 1977 [FR] France .................. 77 02254

[51] Int. Cl.² ............................................. B29F 1/06
[52] U.S. Cl. ........................................ 222/56; 60/560; 60/593; 100/269 B; 222/61; 222/334; 425/146
[58] Field of Search ............... 100/269 B; 60/560, 588, 60/593; 425/145, 146; 222/56, 61, 334, 52

[56] References Cited

U.S. PATENT DOCUMENTS

| | | | |
|---|---|---|---|
| 2,396,539 | 3/1946 | Smith et al. | 60/560 |
| 3,875,365 | 4/1975 | Beneteau | 60/560 X |
| 4,040,776 | 8/1977 | Kelz | 425/145 |
| 4,072,013 | 2/1978 | Barbareschi | 60/593 X |

Primary Examiner—David A. Scherbel
Attorney, Agent, or Firm—Haseltine, Lake & Water

[57] ABSTRACT

An automatic device for supplying an elastomer or like material for an injection machine comprising an injection cylinder and a piston, wherein the piston is controlled by a hydraulic multiplier device formed by two stages, the first stage being called the downstream stage and the second stage being called the upstream multiplier stage, and wherein the device comprises a sensor for controlling the supplying of the cylinder with material so as to stock said cylinder by an electrically driven tape advance unit, the sensor being brought into play when the piston is moved in the forward direction, a pressure controller for tripping the upstream multiplier stage to multiply the pressure in the injection cylinder, the pressure controller being controlled from a pressure threshold of the fluid supply of the first downstream stage and an end of travel sensor for tripping the return of the first and second stages to make the piston return at the end of the injection.

5 Claims, 1 Drawing Figure

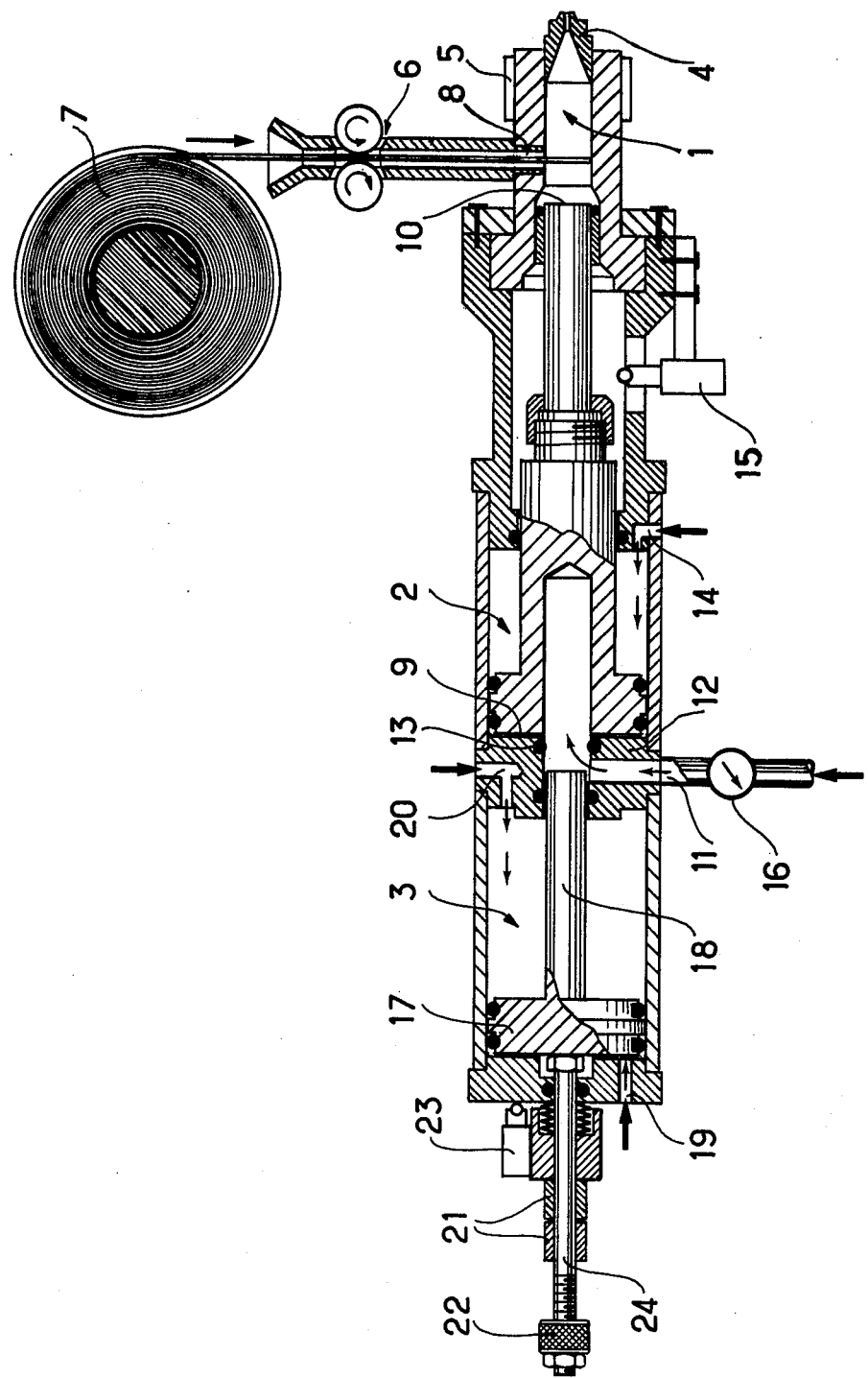

AUTOMATIC DEVICE FOR SUPPLYING AN INJECTION MACHINE WITH A MATERIAL SUCH AS AN ELASTOMER

The present invention relates to an automatic device for supplying a material such as india rubber or some other elastomer to an injection machine, leading in particular to a mould which produces finished products.

It is known that conventional injection machines of the piston and cylinder type operate by means of manual loading at each moulding of a charge of material inside a cylinder said charge being compressed by means of a piston inside the cylinder in order to inject the pasty material into the mould. The problem which arises is due to the fact that it is necessary to resupply gum in a quantity which is only just sufficient in order that the gum is not vulcanized prematurely in the cylinder, as this would cause irremediable deterioration of the material.

Consequently, storage of material inside the cylinder should be minimized. The disadvantage of conventional injection machines results from the difficulty of supplying them properly with material.

Preferred embodiments of the device in accordance with the present invention remedy this disadvantage. Indeed, in such devices, the loading of the gum is automatic, as is controlling the quantity of the gum inside the injection machine.

The present invention provides an automatic device for supplying an elastomer or like material for an injection machine comprising an injection cylinder and a piston, wherein the piston is controlled by a hydraulic multiplier device formed by two stages, the first stage being called the downstream stage and the second stage being called the upstream multiplier stage, and wherein the device comprises means for controlling the supplying of the cylinder with material so as to stock said cylinder by means of an electrically driven tape advance unit, said control means being brought into play when said piston is moved in the forward direction, means for tripping said upstream multiplier stage to multiply the pressure in said injection cylinder, said tripping means being controlled from a pressure threshold of the fluid supply of said first downstream stage and means for tripping the return of said first and second stages to make the piston return at the end of the injection.

An embodiment of the present invention given purely by way of illustration and having no limiting character will be described with reference to the single FIGURE which shows schematically a longitudinal cross-section of the injection machine.

As will be seen in the FIGURE, the injection machine is composed of three main parts: an injection cylinder 1, a hydraulic stage 2 and a multiplier stage 3 which can be pneumatic. The injection cylinder 1 is of the piston type with a removable nozzle 4. A sleeve 5 provided with electrical registors is provided for heating the end of the injection cylinder 1. The material is supplied by means of an electrical tape advancing unit 6 with rollers which drive an india rubber tape by means of a bobbin 7 and which insert this tape through a slot 8 inside the injection cylinder 1. The end of the nozzle 4 supplies a mould, not shown.

The hydraulic stage 2 consists of a hydraulic piston 9 and an injection piston 10. The multiplication ratio of the hydraulic stage is equal to the ratio between the large cross-section of the hydraulic piston 9 and the small cross-section of the injection piston 10. This ratio is, by way of an example, about 12. The hydraulic piston is supplied at low pressure with oil entering the hydraulic stage 2 through an orifice 11 at a maximum pressure of 5 bars for example. The oil is supplied by an intermediate block 12 through a lip seal 13. At the end of the hydraulic piston 9, the injection piston 10 is fixed by a floating installation. The hydraulic piston is returned by air at a pressure of 5 bars, by way of an example, coming from the orifice 14. A sensor 15 whose position on the body of the hydraulic stage 2 is adjustable is actuated by a protrusion of the rod of the hydraulic piston 9. The function of the sensor 15 is to control the energizing of the advance of the tape 6. A pressure controller 16 disposed on the oil input circuit controls the supply to the multiplier stage at pressures above 5 bars for example. This control is pneumatic.

The multiplier stage 3 comprises a pneumatic piston 17 and a plunger ram 18 which has a small diameter. The stage 3 is supplied with air at a pressure of 10 bars in our example, passing through the orifice 19. The multiplication ratio is equal to the ratio between the cross-section of pneumatic piston and of the plunger ram, i.e. for example a ratio of 16. As has been said hereinabove, the pneumatic piston 17 is controlled only by the action of the pressure controller 16. The multiplier stage 3 is returned by compressed air (at a pressure of 6 bars for example) coming from the orifice 20. The travel of the multiplier assembly is limited by adjustable stops 21 disposed on the outside of the body of the injection machine. A knurled nut 22 makes it possible to adjust finely. An end of injection sensor 23 detects the arrival against a stop of an exterior rod 24 integral with the pneumatic piston 17 and after a short delay controls the rising of the multiplier stage 3 and hydraulic stage 2 by intakes of air through the orifices 14 and 20.

The adjustable travel of the rod 24 determines the movement of an accurate volume of oil which causes the movement of the hydraulic unit and injection piston assembly along a distance corresponding to the volume of material to be injected.

The operation of the injection machine is as follows:

The injection cylinder 1 is previously lined with the material in reserve coming from the previous operations (for example 8 cm$^3$) and the india rubber tape is advanced in the cylinder.

In a first phase, only the hydraulic stage operates. When the piston 9 advances the strip of material which extends into the cylinder is cut and bears against the cushion of gum in reserve in the cylinder, the assembly is compacted at a pressure of 60 bars, for example, which is insufficient to make the material pass through the nozzle.

When the piston stops, the rise in oil pressure is detected by the pressure controller 16 and a pneumatic signal actuates the air intake through the orifice 19.

In a second phase, the multiplier stage 3 operates in addition to the hydraulic stage 2. The plunger ram 18 passes in the lip seal 13 thus stopping up the oil input. When it ends its travel, since the chamber is closed, it acts as a pump according to the multiplication ratio. The pressure which is set up in the cylinder then rises to 1800 bars, by way of an example and the material heated by the sleeve 5 is injected in a mould. To check the volume of gum, the volume of oil moved is checked (product of the travel of the piston 18 by the cross-section of the piston 18) which is itself dependent on the travel of the rod 24 stopped by the adjustable stops 21. The movement of the injection piston 10 therefore practically determines the same volume of material to be injected for a same adjustment of the travel of the multiplier.

The material is supplied by the starting of the motor of the tape advance unit 6. The sensor 15 whose position along the body of the hydraulic stage is adjustable is controlled by the edge of the hydraulic piston 9. If, at the end of injection, the volume of material in reserve in the cylinder 1 is greater than the maximum tolerated, the piston 9 stops before it reaches the end of the cylinder and it does not actuate the sensor 15. The material is not supplied again by the tape advance unit 6 and the following injection will not fill the cylinder. If the level of the material in the cylinder is too low, the sensor 15 is actuated. The adjustment of the position of the sensor and of the dimensions of the tape makes it possible to stock an accurately calibrated volume in the injection cylinder 1 so that the mixture will not stay too long, as this would cause a premature vulcanisation of the gum.

In a third phase, at the end of the travel of the injection piston detected by the end of injection sensor 23 and after an adjustable delay called the "maintenance of pressure" delay during which the material continues to flow in the hydraulic stage and the multiplier stage are supplied for return by the orifices 14 and 20. The plunger ram 18 unblocks the lip seal 13 and the oil can return towards the orifice 11 this allowing the hydralic piston 9 to rise. The sensor 15, actuated during the second phase, causes the motor of the tape advance unit 6 to start during the third phase by means of delayed-action relays. During the rise of the piston 9 the cylinder is stocked with material. At the end of the third phase, the two pistons 18 and 9 rise.

It is self-evident that the invention is in no way limited to the examples which have been given thereof but comprises all embodiments using equivalent means. Thus the multiplying stage can be hydraulically controlled.

Applications come with in the field of injection presses, intended in particular for moulding india rubber products.

What is claimed is:

1. An automatic device for supplying an elastomer or like material for an injection machine comprising an injection cylinder and a piston, wherein the piston is controlled by a hydraulic multiplier device formed by two stages, the first stage being called the downstream stage and the second stage being called the upstream multiplier stage, each stage having a fluid supply, and wherein the device comprises means for controlling the supplying of the cylinder with material so as to stock said cylinder by means of an electrically driven tape advance unit, said control means operating when said piston is moved in the downstream direction, means for starting said upstream multiplier stage to multiply the pressure in said injection cylinder, said starting means being controlled from a pressure threshold of the fluid supply of said first downstream stage and means for actuating said first and second stages to make the piston return at the end of the injection.

2. A control device according to claim 1, wherein said means for controlling supplying with material comprise a sensor which is tripped by the movement from a protruding position of the piston and which controls the advance of a strip of material intended to stock the injection cylinder.

3. A device according to claim 1, wherein said means for tripping the multiplier stage comprise a pressure controller disposed at the input of the fluid supply of said downstream stage.

4. A device according to claim 1, wherein said means for actuating said first and second stages to return said piston comprise an end of travel sensor controlling injection of compressed air to said first and second stages.

5. A device according to claim 4, wherein said end of travel sensor is actuated by a rod integral with the piston of the upstream multiplier stage.

* * * * *